United States Patent [19]

Hank et al.

[11] Patent Number: 4,881,182

[45] Date of Patent: Nov. 14, 1989

[54] METHOD FOR CONTROLLING INK DENSITY

[75] Inventors: Dietrich Hank; Peter Brüggemann, both of Leipzig, Fed. Rep. of Germany

[73] Assignee: VEB Kombinat Polygraph, "Werner Lamberz", Leipzig, Leipzig, Fed. Rep. of Germany

[21] Appl. No.: 79,632

[22] Filed: Jul. 29, 1987

[30] Foreign Application Priority Data

Nov. 13, 1985 [DE] Fed. Rep. of Germany ....... 2962177

[51] Int. Cl.⁴ ...................... G01B 11/14; G06F 15/626

[52] U.S. Cl. ..................................... 364/519; 101/365; 101/DIG. 45; 364/526; 364/552

[58] Field of Search ............... 364/519, 520, 526, 551, 364/552, 556, 571, 550, 300, 571.01, 571.02; 101/335, 363, 364, 365, DIG. 45

[56] References Cited

U.S. PATENT DOCUMENTS 4,648,048 3/1987 Dorn et al. ..................... 364/520 X 4,665,496 5/1987 Ott ................................. 364/552 X

FOREIGN PATENT DOCUMENTS 2931579 2/1981 Fed. Rep. of Germany .

3211157 10/1983 Fed. Rep. of Germany .

3220701 12/1983 Fed. Rep. of Germany .

3444784 6/1985 Fed. Rep. of Germany .

OTHER PUBLICATIONS

"Taschenbuch Elektrotechnik", Berlin, VEB Verlag Technik, p. 421, vol. 2, 1977.

*Primary Examiner*—Gary V. Harkcom
*Assistant Examiner*—H. R. Herndon
*Attorney, Agent, or Firm*—Michael J. Striker

[57] ABSTRACT

In a method for controlling ink density, control deviations of ink density are alternatively utilized for dosing moisture agent amounts and dosing printing ink amounts. The dosing of moisture agent amounts is carried out by the inquiry process and this process is controlled by the comparison of ink densities on control strips with given reference values.

3 Claims, 2 Drawing Sheets

METHOD FOR CONTROLLING INK DENSITY

BACKGROUND OF THE INVENTION

The present invention relates to a method for controlling and adjusting an ink density during the printing process in rotary printing machines for offset printing. More particularly, the invention relates to a method for controlling ink density in rotary roller printing machines.

Optimal ratios of the amounts of printing ink and moisturizing agent fed to the plate cylinder are important to obtain good quality of the offset printing. It is not sufficient to maintain the ratio of the aforesaid amounts within predetermined allowance limits, between which ink or water smearing marks in the printing would not occur.

It has been common practice to believe that the quality offset printing depends on the determined moisture agent portion in the printing ink. The elasticity of the printing ink depends on the portion of the moisture agent emulsified in the printing ink so that the full tone or shade density and the tone or shade value of the printing are considerably influenced.

The emulsifying of the moisture agent in the printing ink is caused by high pressure at contacts between the ink applying rollers and the plate cylinder. The portion of the moisture agent in the ink-moisture agent emulsion depends upon the moisture agent supply and the moisture agent need for the image-free locations of the printing plate—, upon the moisture agent amounts available on the printing plate and the properties of the moisture agent and the printing ink, the emulsifying quality of the ink-moisture agent mixture, the peripheral speed of the plate cylinder, rubber cloth and printing material, environmental temperatures and humidity and other various influencing factors.

With widely utilized printing machines with a moisture agent feeding provided over the printing machines width it has been obtained that various zonal requirements of the moisture agent corresponding to the ink profile for the upper surface of the image-free locations have been compensated for by the moisture agent content in the ink-moisture agent emulsion. The zonally-different ink-moisture agent emulsion is formed automatically. It has been disclosed, for example in DE-OS 29 31 579, DE-OS 32 11 157 and DE-OS 32 20 701 that the quality offset printing requires as uniform and optimal ink-moisture agent-emulsion over the entire width of the printing machine as possible, which leads to required profiles and the zonal moisture agent supply.

In the DE-OS 29 31 579 the control characteristic curve of the zonally fed moisture agent amounts is controlled according to zonally fed ink amounts without an answer-back signal indicative of the emulsified moisture agent amounts. The disadvantage of this otherwise satisfactory method resides in that it does not react to local flucuations of the ink-moisture agent ratios caused by such disturbing factors an environment temperatures and humidity and machine heating. A further disadvantage of this known method is that no correction possibilities are provided for various emulsifying properties of different ink-moisture agent mixtures or various moisture agent storing abilities of the printing plate.

The method disclosed in DE-OS 32 11 157 teaches the step of the zone-wise measurements of the moisture agent amounts on the upper surface of the printing plate and computing of the control deviation and place of contact. The emulsified moisture agent amount is however not determined with this solution.

In DE-OS 32 20 701, a hydrophilic measuring roller operates in contact with the ink applying rollers and a measuring device which issues a signal indicative of wetting of the measuring roller with ink or moisture agent over the printing machine width in portions. As soon as the portion of ink increases on the measuring roller at which the moisture agent supply is near the lower tolerance limit an additional moistening takes place in this portion, and as soon the portion of ink increases at the measuring roller at which the moisture agent supply is near the upper tolerance limit, the moisture agent is wiped off in this portion. The disadvantage of this conventional solution resides in that in connection with rigid control of the moisture agent supply the moisture agent feeding principally works in the proximity of one or the other tolerance limit, and the optimal ink-moisture agent radio of the emulsion is excluded.

Also known are a method and device for a separate measurement of the amount of the moisture agent on the upper surface of the roller and the emulsified moisture agent amount. These features have been disclosed in DE-OS 34 44 784. The measurement takes place in a contactless fashion and is executed by a diffused light reflection through the emulsified moisture agent. The separate measurement enables the influence of the ink-moisture agent emulsion.

The disadvantage of the last mentioned method resides in high costs of the equipment. The light intensity measurement of the reflected light beam as well as of the directed and also diffused beam portion and the intensity measurement of the reflected diffused beam portion require photo-electronic transmission means and A/D conversion means for signals measured and as well as a number of evaluation means to determine the amounts of the moisture agent. A particular disadvantage of the solution resides in the necessity to provide calibration of the measuring device. A high expensive is connected also with a quick insertion.

SUMMARY OF THE INVENTION

It is an object of the present invention to provide an improved method for controlling ink density during a printing process in a rotary printing machine of offset printing.

It is a further object of the invention to provide a control method the utilization of which would ensure quality and safety of the printing process with a separate print and would ensure a continual control of an optimal dosing of the moisture agent amounts in the printer.

Yet another object of the invention is to maintain the ink-moisture agent-ratio in the ink-moisture agent emulsion uniform over the entire width of the printing machine and constant during separate printing.

These and other objects of invention are attained by a method for controlling ink density in a printing process in a rotary printing machine for offset printing, wherein ink control strips of a print are periodically scanned and deviations of ink densities from desired values are measured and employed for dosing printing ink amount; the method includes the steps of first applying the measured deviations of ink densities for dosing moisture agent amounts and then alternating the dosing of printing ink amounts with the dosing of the moisture agent amounts. The dosing of moisture agent amounts is carried out in one searching procedure including a sequence of adjusting operations, controlling the searching procedure by comparing ink densities with a raster tone or shade surfaces, and limiting the searching procedure to a given maximal allowable number of adjusting operations in the same direction.

Ink density controlling methods for dosing printing ink amounts have been known and introduced on the market. The measurement of ink density takes place densition metrically on one of ink control strips printed on the print edge transversely to the direction of rotation, which strip in each ink zone contains the assigned participating printing inks in a full tone or shade and in many raster tones or shades. Each adjusting operation is computed from a control deviation and the searching process leads after a predetermined number of prints to a new smaller control deviation. The latter is the smaller the better is the searching proces considered in a corresponding algorithm. With average deviations, a single control or searching process is sufficient to reduce the control deviation to the value of the process fluctuation range. To further reduce the process fluctuation range, if a quality print is required, the ink density control circuit for dosing moisture agent amount for carrying out the method according to the invention is assigned to the known ink density control circuit.

To avoid an alternating start up both control circuits alternatively control the ink density. The alternative control is possible after a certain waiting time which depends upon the control time constant of the actuated control circuit. Since the ink density as a function of the moisture agent amount is non-reversible the ink density value can exactly correspond to two different values of the moisture agent amount, and inasmuch the ink density strongly depends on the moisture agent amount in each printing ink only an inquiry or searching process appears to be suitable for the dosing of moisture agent amounts.

The inquiry or searching process is controlled by the comparison measured of ink densities with raster of tone or shade surfaces.

A course of the method of the invention may be computer controlled in accordance with a command order or an algorithm in a storage.

A specific techno-economical effect of the invention resides in the utilization of a known method of the ink density control for dosing printing ink amounts by measuring ink density deviations zone-wise. Expensive measuring device for measuring moisture agent amounts of the ink-moisture agent emulsion are omitted in the proposed invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

The operating sequence of the searching process according to the invention will be now explained with reference to the drawings. The operating sequence of the process of this invention is computer-controlled in accordance with the command order or algorithm read out from the storage of the computer. Ink control strip of the printing is periodically scanned. The deviations of ink density from a reference value are measured and the occurring control deviations are alternately used for dosing the moisture agent amounts and for closing printing ink amounts, beginning with the dosing of moisture agent amounts. The dosing of moisture agent amounts takes place in a searching process including a sequence of adjusting steps which are controlled by the comparison of measured ink densities on a control strip with a desired value on a raster tone or shade surfaces.

During each adjusting step, a setting member for moisture agent is adjusted such that a discrete change by the same amount in one introduced direction (e.g. toward the enlargement) of the feeding takes place after each adjusting step, the result of adjustment is measured and, as long as an improvement of the measured control deviation (that is an approach of the measured ink density on an ink control strip toward a desired ink density value on a raster of shade surfaces) is detected, the sequence of adjusting steps continues. In opposite case, a sequence of shorter adjusting steps in the opposite direction (toward the decrease of the feeding of the moisture agent) is introduced and, if no further improvement of the control deviations is achieved, the process is interrupted.

Figure 1:
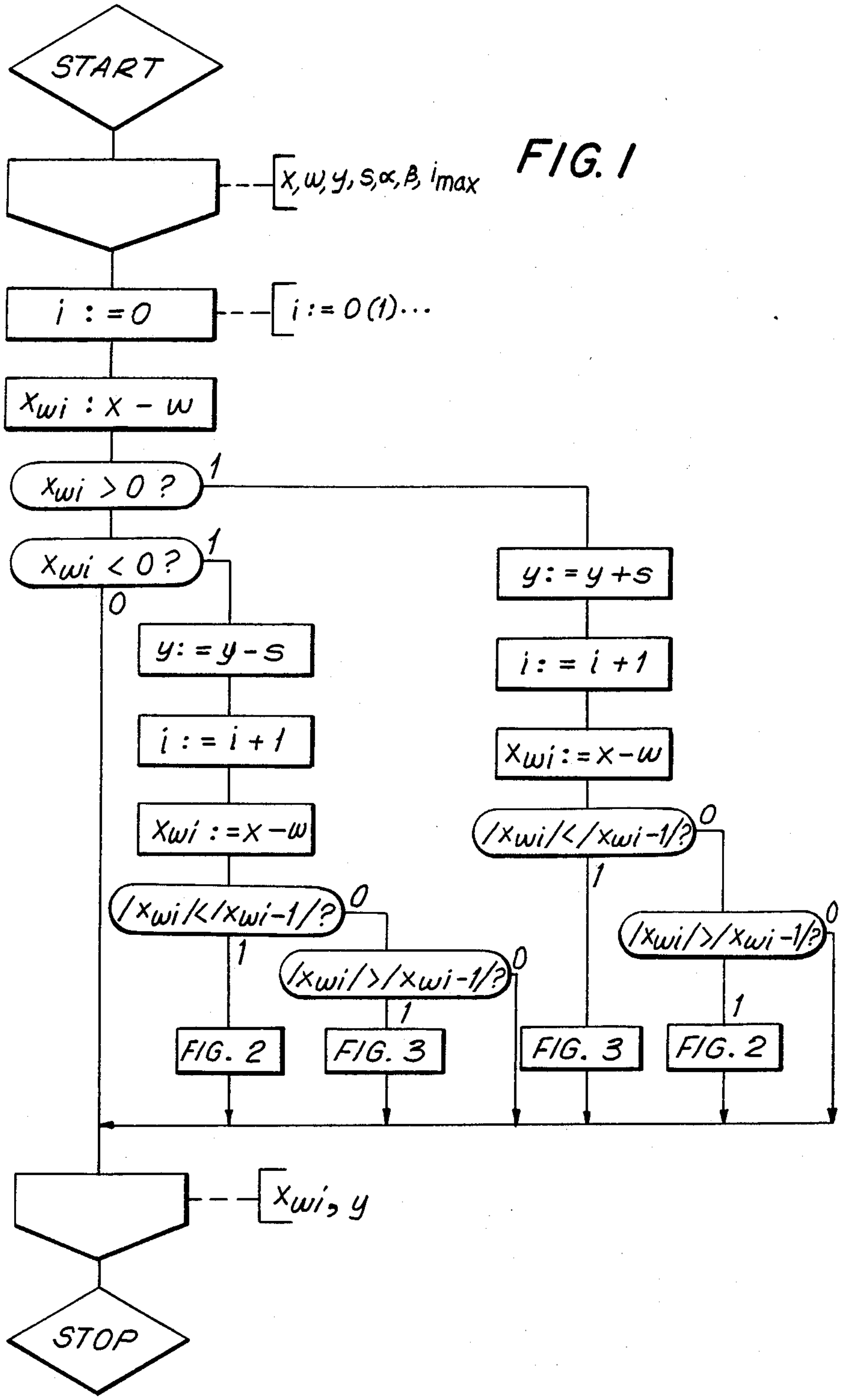
FIG. 1 is a flow chart diagram of the interrogation or searching process for dosing moisture agent amounts.

Referring to FIG. 1, the searching process starts with the input into the computer of the ink density value X, the ink density reference value W, the adjustment value Y of the moisture agent amount obtained in the control process, the start step width S, the step with enlargement factor $\alpha$ and the step width decreasing or shortening factor $\beta$.

At the start of the searching process, the consecutive or ordinal number i for the deviation $X_{wi}$ of the ink density is set to 0. In the course of the searching process the number i is increased by one with each execution of the adjustment step for the value Y of the moisture agent.

The dosing of the moisture agent amount is carried out in a sequence of adjustment steps, in which:

the amount and direction of the control deviation Xw of the ink density in the first adjustment step is measured;

the moisture agent amount Y in the second adjustment step is adjusted by the start step width S in the direction of the moisture agent content increase if the reference value is exceeded and in the direction of the moisture agent content reduction if the reference value falls below;

in the third adjustment step, which follows the second step at the interval of the waiting time, the control deviation value Xw of the ink density is re-measured and is tested for the reduction or increase, that is the reduction of the control deviation value Xw of the ink density in the third step is compared to that obtained in the first step;

in the fourth step, the moisture agent amount Y is adjusted by the start step width S multiplied by the step width enlargement factor " " in the direction of the start adjustment step; in case the third adjustment step has the increase of the control deviation value Xw of the ink density it is compared with that of the first step;

the moisture agent amount Y in the fourth adjustment step is adjusted by the start step width S multiplied by the step with increase factor $\alpha$ in the direction opposite to the direction of the start adjustment step;

in the fifth adjustment step, which follows the fourth step at the interval of the given waiting time, the control deviation value Xw of the ink density is again measured and tested for the reduction or increase, that is if the fifth adjustment step has the reduction of the control deviation Xw of the ink density it is compared to that of the third step which is repeated from the step sequence formed by the fourth and fifth steps; in case the fifth adjustment step has the increase of the control deviation value Xw of the ink density it is compared to that of the third adjustment step;

in the sixth adjustment step, the moisture agent amount Y is adjusted by the start step width S multiplied by the step reduction factor in the direction opposite to the direction of the fourth adjustment step;

in the seventh adjustment step which follows the sixth step at the waiting time interval, the control deviation value Xw of the ink density is re-measured and tested for the reduction, that is in case the seventh step has the reduced control deviation Xw of the ink density in comparison to that of the fifth step the step sequence formed by the sixth and seventh steps is repeated; if the third and fifth adjustment steps have no reduction or increase or the seventh adjustment step has no reduction of the control deviation value Xw of the ink density the searching process for the dosage of the moisture agent amount is ended, and with the next scanning of the ink control strip and measuring the control deviation Xw, the dosing of the printing ink amount is executed.

Figure 2:
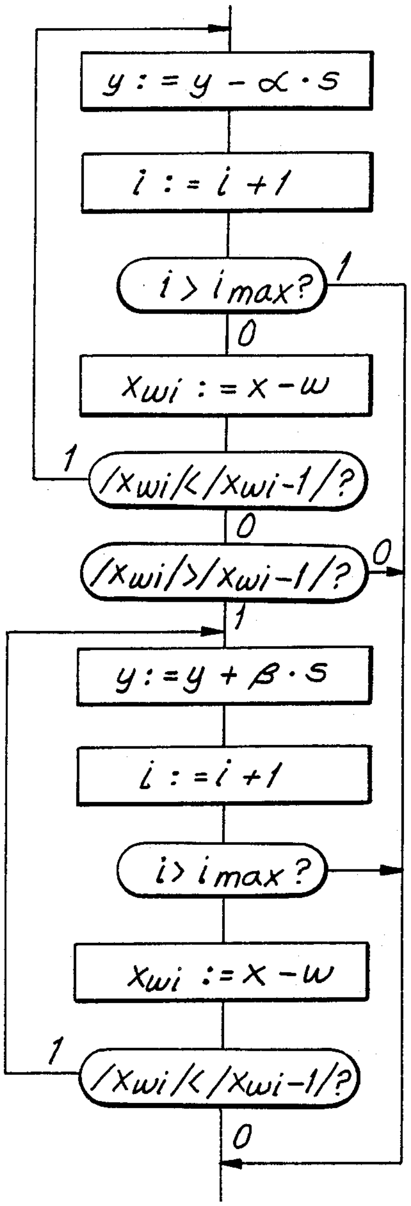
FIGS. 2 and 3 are portions of the diagram of FIG. 1 with multiple executed process operations.
Figure 3:
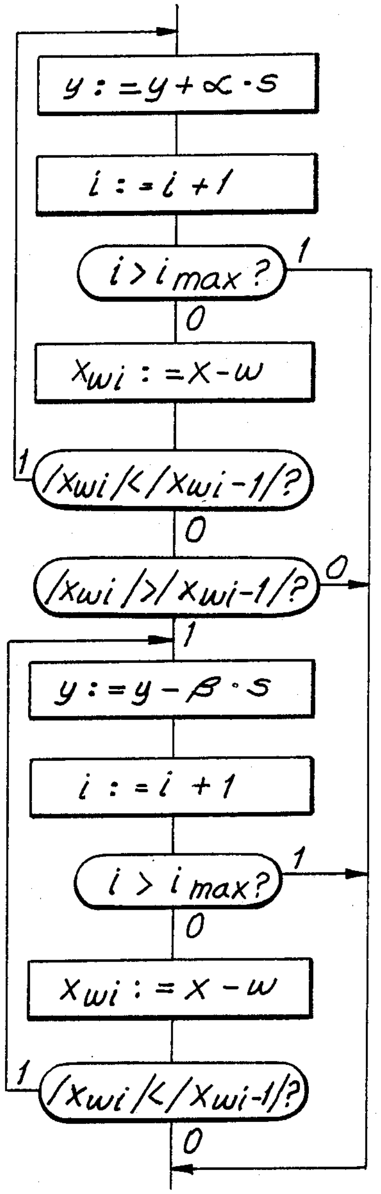

Accordingly, Xw, Xwi-1 and Xwi in FIGS. 1 to 3 are control deviation values of the ink densities whereas i is the operation number of the deviation of the ink density as set forth above.

By the repetition of the fourth and fifth or sixth and seventh adjustment steps a loop is formed, which loop, upon the repetition of the results passes through the reduction of the control deivation Xw of the ink density for many times. The number of sweeps i is limited by a given maximal allowable number $i_{max}$ of the adjusting steps of the same direction for dosing the amount of the moisture agent to be applied to the printing plate. Thereby it is ensured that large control deviations Xw of the ink density are alternated and the dosing of the amount of the printing ink to be applied is stabilized.

The searching process ends with the output of the remaining control deviations Xwi of the ink density and the adjusting value Y of the moisture agent amount after the last executed adjusting step which has found optimal moisture agent quantities.

It will be understood that each of the elements described above, or two or more together, may also find a useful application in other types of methods for controlling ink density in a printing process differing from the types described above.

While the invention has been illustrated and described as embodied in a method for controlling ink density in a printing process it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for controlling ink density in a printing process in a rotary printing machine for offset printing, wherein ink density control strips are printed during the printing process, comprising the steps of periodically scanning the control strips to determine control deviations of respective ink densities from reference values; alternately applying the measured control deviations for controlling the dosing of moisture agent amounts and of printing ink amounts, beginning with the dosing of a moisture agent amount; adjusting the dosing of the moisture agent amounts in a searching process including at least one sequence of adjustment steps for providing an increased or reduced supply of uniform amounts of the moisture agent, and limiting the sequence to a given maximal number of adjustment steps in the direction of increased or reduced supply.

2. The method as defined in claim 1, wherein said searching process includes the following sequence of adjustments steps:

(a) a value and direction of a control deviation $X_W$ of ink density is measured;

(b) a moisture agent amount Y is adjusted by a start step width S in the direction of moisture agent increase if a reference value is exceeded and in the direction of moisture agent reduction if the reference value falls below;

(c) after a waiting time interval, the control deviation value $X_w$ of the ink density is re-measured and tested for reduction or increase relative to the control deviation value of step (a) and the process jumps to step (i) if the tested control deviation value has neither increased nor decreased;

(d) the moisture agent amount Y is adjusted by the start step width S multiplied by an enlargement factor $\alpha$ in the direction of step (a) if the control deviation value tested in step (c) has decreased, or in the opposite direction if the tested control deviation has increased;

(e) after a waiting time interval, the control deviation value $X_W$ of the ink density is re-measured and tested for reduction or increase relative to the control deviation value of step (c), and the process jumps to step (i) if the tested control deviation value has neither increased nor decreased;

(f) steps (d) and (e) are repeated if the control deviation value tested in step (e) has decreased, or the moisture agent amount Y is adjusted by the start step width S multiplied by a reduction factor $\beta$ in a direction opposite to the direction of step (d) if the tested deviation value has increased;

(g) after a waiting time interval, the control deviation value $X_W$ of the ink density is re-measured and tested for reduction or increase relative to the control deviation value of step (e);

(h) steps (f) and (g) are repeated if the control deviation value tested in step (g) has decreased; and (i) the next ink control strip is scanned, the corresponding control deviation $X_W$ is determined and the dosing of the printing ink amount is executed.

3. A method as defined in claim 2, wherein said searching process is computer-controlled in accordance with an algorithm stored in a computer storage.

* * * * *